July 12, 1955 J. J. WALLACE 2,712,673
COTTON PRECLEANING APPARATUS
Filed Sept. 25, 1951 2 Sheets-Sheet 1
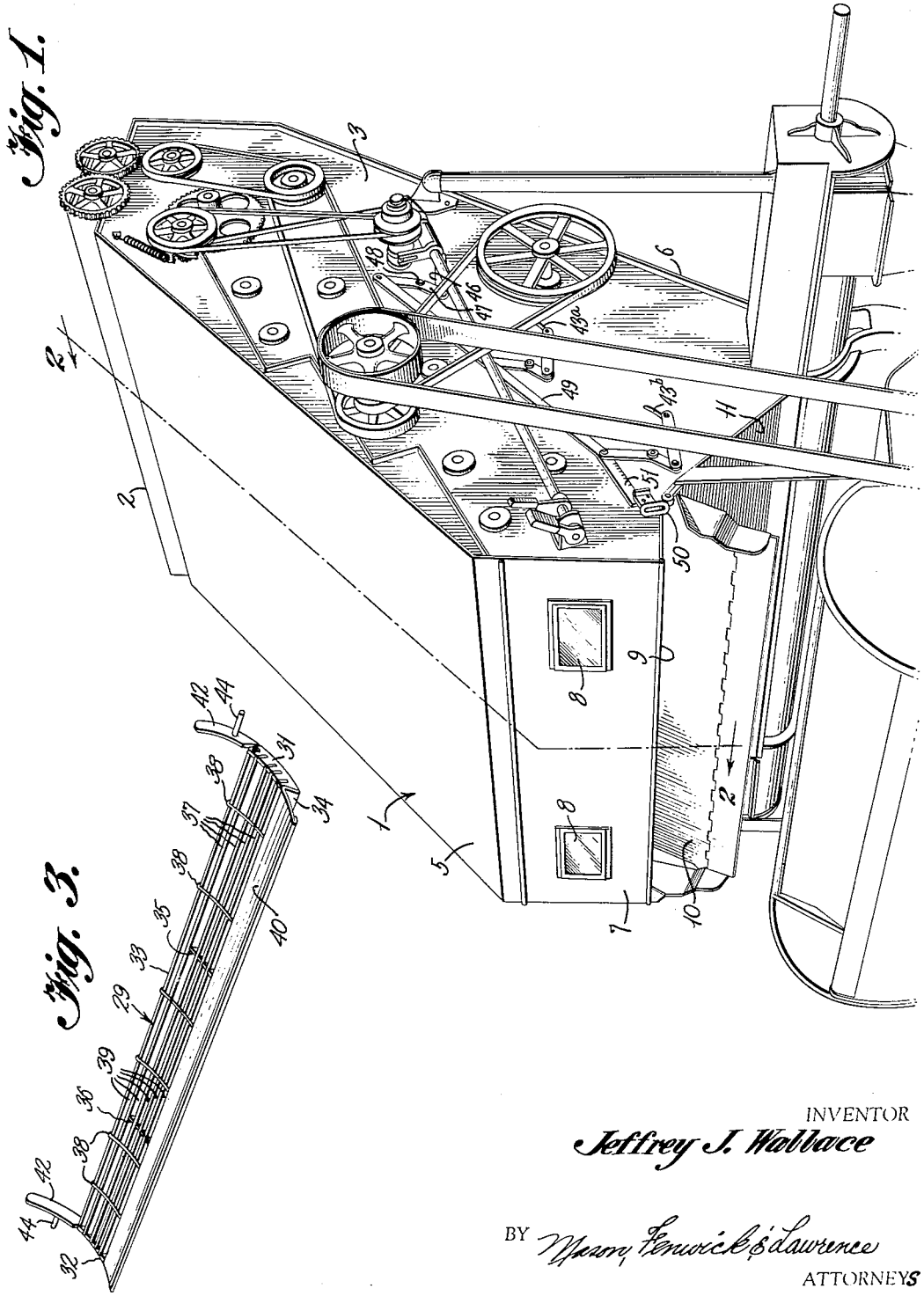
INVENTOR
Jeffrey J. Wallace
BY Mason, Fenwick & Lawrence
ATTORNEYS

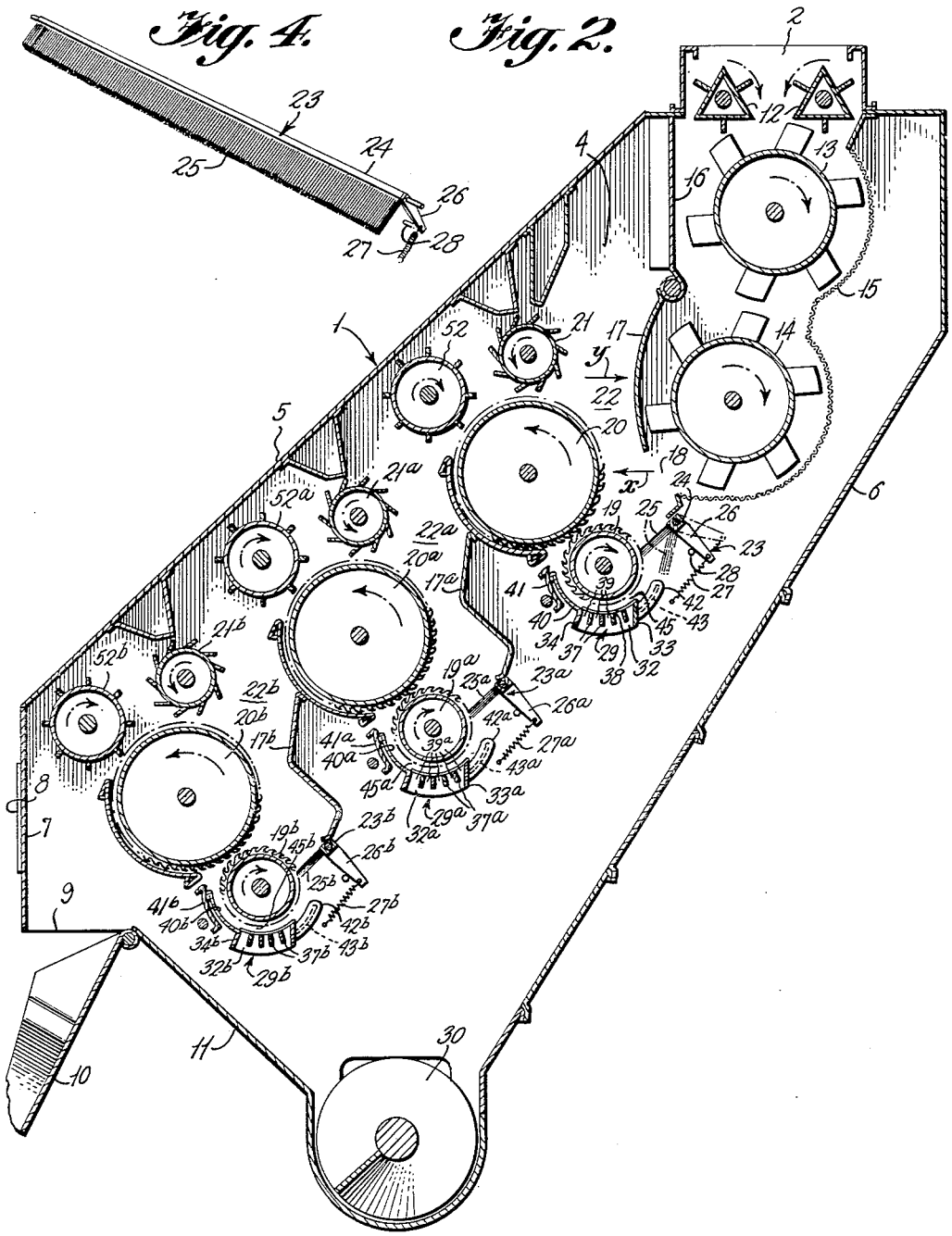

United States Patent Office 2,712,673
Patented July 12, 1955

2,712,673

COTTON PRECLEANING APPARATUS

Jeffrey J. Wallace, Amite, La., assignor to Gullett Gin Company, Amite, La., a corporation of Louisiana Application September 25, 1951, Serial No. 248,149

6 Claims. (Cl. 19—37)

This invention relates to a precleaner for seed cotton, of the type known as a hull extractor, for removing hulls, trash and dirt before the cotton enters the gin.

The general object of the present invention is the improvement in a hull extractor of this type in the arrangement of the hull and cotton separating instrumentalities as well as the structure which controls the discharge of the hulls and other foreign matter separated from the cotton.

Other objects of the invention will appear as the following description of a preferred and practical embodiment thereof proceeds.

In the drawings throughout the figures of which the same reference characters have been used to denote identical parts:

Figure 1 is a perspective view of a hull extractor embodying the principles of the invention, the hull extractor being shown mounted upon a gin;

Figure 2 is a section in a medial longitudinal plane taken along the line 2—2 of Figure 1;

Figure 3 is a perspective view of the adjustable deflector grid;

Figure 4 is a perspective view of the brush.

Referring now in detail to the drawings, and particularly Figure 2, the numeral 1 represents a casing, as a whole, having an inlet opening 2 at the upper end, similar parallel end walls 3 and 4, the wall 3 being shown in Figure 1, and the wall 4 in Figure 2, and upper and lower walls 5 and 6, which incline downwardly in the same general direction. That part of the chamber within the casing which lies next to the lower wall 6 is a passage for hulls and debris after separation from the cotton, which gravitate downward into a screw conveyor 30, which carries them to a point outside the casing. That part of the casing chamber which lies adjacent the upper wall 5 is a cotton passage, the cotton becoming progressively cleaner as it descends. The upper wall 5 terminates at the front wall 7, which as shown, is in a vertical plane and has the sight windows 8. A cotton discharge opening 9 is provided adjacent the lower end of the front wall 7 under which is a hinged chute 10 that delivers cotton into the mouth of the gin. Between the opening 9 and the trough of the conveyor 30 the bottom wall 11 of the casing inclines downward toward the conveyor to funnel into the latter such debris as may land on said bottom wall.

A pair of cooperating feed rolls 12 are located at the inlet opening 2. These are driven at regulatable speed and are generally set to pass cotton at the rate at which the gin can handle it. They may be stopped and restarted at will, without interrupting the operation of the other driven instrumentalities of the precleaner, and when restarted they operate at the speed at which they are set to run. The means for so controlling the operation of the feed rolls is conventional; said means are incidentally shown on the outside of the casing in Figure 1; form no part of the present invention, and therefore, will not be described.

The feed rolls 12 deliver cotton to a pair of directing drums 13 and 14. These are encased on the side next to the debris passage by a screen 15, which underlies the lower directing drum 14. The opposite sides of the directing drums are cased by a fixed partition 16, the lower part of which is a baffle 17. The lower end of the baffle is spaced from the adjacent end of the screen, forming an opening 18.

Spaced from the baffle 17 and the opening 18 are three cooperating cylinders 19, 20 and 21, serially in substantial tangency, defining with said baffle and the plane of the opening 18, a chamber 22.

The cylinder 20, hereinafter called the saw cylinder, has a clothing of saw teeth. As viewed in the drawing, it rotates counterclockwise. The reclaiming cylinder 19 is similar in construction to the saw cylinder, but smaller, and rotates clockwise. At their points of tangency the teeth of both cylinders 20 and 19 move in the same direction, but the peripheral speed of the saw cylinder is faster than that of the reclaiming cylinder. The cylinder 21, hereinafter called the striker roll, has longitudinal flights or vanes arranged angularly with respect to radial planes, as shown. The striker roll rotates counterclockwise. At their point of tangency the flights of the striker roll and the teeth of the saw cylinder travel in opposite directions. The flights move at a higher peripheral speed than the saw teeth. The three cylinders above previously described have their structural counterparts in prior hull extractors, and therefore, do not need to be more particularly defined.

The striker roll 21 is positioned laterally of the baffle 17, while the reclaiming cylinder 19 is at the bottom of the chamber 22. The saw cylinder 20 occupies an intermediate position between the two and is lateral with respect to the opening 18.

A brush 23 extends longitudinally across the reclaiming cylinder, bridging the space between said cylinder and the adjacent end of the screen 15. It therefore shares with the reclaiming roll in forming the bottom of the chamber 22. The brush comprises a bar 24, having trunnions at its ends journaled in the end walls 3 and 4 of the casing 1. A row of bristle filaments 25, preferably of stainless steel, is fixed to the bar 24, the free ends of said filaments sweeping the circumference of the reclaiming cylinder. Adjacent one end wall of the casing, on the inside, the bar 24 has an arm 26 fixed thereto, a spring 27 being anchored at one end to said arm, and at its other end to said wall of the casing. The spring pulls the arm against a stop 28, projecting inwardly from the said end wall of the casing, maintaining the brush in its normal position shown in full lines in Figure 2, from which it is swingable against spring bias to the broken line position. The brush cooperates with the adjacent end of an arcuate deflector grid 29 to define a discharge opening, permitting discharge of debris from the lower part of the chamber 22 into the debris passage.

A description of operation fits in at this point. The directing drums 13 and 14 throw the cotton against the screen 15, causing some of the small trash that loosely contaminates the cotton to sift through said screen, which falls to the bottom of the debris passage into the screw conveyor. The lower directing drum 14 throws the cotton through the opening 18. Most of it follows the general trajectory indicated by the arrow $x$ and lands against the saw cylinder, the major portion becoming attached to the teeth of said saw cylinder. Some will not become immediately attached, but will fall upon the reclaiming cylinder and become attached to the teeth of the latter. Some cotton thrown through the opening 18 will at first instance fall upon the reclaiming cylinder and become engaged by the teeth of said cylinder.

The cotton on the teeth of the saw cylinder is carried up to the working region of the striker roll. Not only is the cotton which directly contacts the saw cylinder thus carried up, but also cotton snatched by the teeth of the faster moving saw cylinder from the teeth of the reclaiming cylinder. When the cotton on the saw cylinder reaches the striker roll it is contacted by the flights of the latter which strike the hull fragments impactively, throwing them against the baffle 17 in the general direction indicated by the arrow y. Their velocity is checked by contact with the baffle so that they fall gravitationally to the bottom of the chamber 22 upon the cotton attached to the reclaiming cylinder or upon cotton which is about to become so attached. Since they fall upon the surface of the cotton, they are loose and in condition to be combed off of the cotton by the brush 23.

The cotton attached to the reclaiming cylinder 19 freely passes between the bristles of the brush 23 and is carried around into the working region of the saw cylinder to be transferred thereto. The hull fragments at the bottom of the chamber 22 overlie the reclaiming cylinder in frictional contact with the cotton covered surface thereof, and therefore, are urged forward with some pressure against the brush, bending back such bristles as they contact escaping into the debris passage. Some are of such size as to engage a greater extent of bristles than they have sufficient pressure to deflect. These would ordinarily accumulate and impair the efficiency of the brush, but by the present invention their pressure is transmitted to the spring 27, stretching it, permitting the brush as a whole to yield, opening a space between the ends of the bristles and the surface of the reclaiming cylinder, through which said hull fragments escape. Occasionally, a large foreign object such as a piece of wood or even an old shoe, comes into the precleaner with the cotton, which ordinarily would lodge against the brush and require the apparatus to be stopped until it was removed. In the present construction such an object would tilt the brush sufficiently to let it pass.

When the bristles are deflected, or the brush as a whole is tilted to pass the debris, any cotton in the bottom of the chamber 22 which is not at the time firmly attached to the teeth of the reclaiming cylinder would be likely in the absence of preventive measures, to pass with the debris into the debris passage. The deflector grid 29 prevents this.

Said grid is an arcuate member extending the length of the reclaiming cylinder, therebeneath, and spaced therefrom. It is curved coaxially with the reclaiming cylinder, and provides a passage 45 about the lower part of said cylinder to a point adjacent the saw cylinder. The grid is formed as a frame, having slotted end members 31 and 32 and spaced longitudinal front and rear members 33 and 34 fixed at their ends to the end members. Intermediate members 35 and 36 bridge the space between said front and rear members, being fixed thereto. Said intermediate members are slotted to correspond with said end members, and narrow bars 37 with their width dimension depthwise for strength, are seated in said slots. Wires 38 cross the bars 37, separating the spaces between the bars into relatively long meshes 39. The rear member terminates in a wide arcuate plate 40, which as shown in Figure 2, rests upon an arcuate seat member 41, extending between the end walls 3 and 4 of the casing, and being fixed theerto. The forward ends of the end members 31 and 32 have flat arcuate extensions 42 which fit against said end walls 3 and 4 and occlude arcuate slots 43 formed in said end walls. Guide pins 44, fixed to the extensions 42, project through the slots supporting the forward end of the deflector grid, and making it adjustable in a front and back direction in a path coaxial with the reclaiming cylinder. The front edge of the grid cooperates with the brush to determine the width of the space through which the debris is discharged. The front edge of the grid, which also forms the lower side of the discharge passage, is adjustably set sufficiently forwardly to catch any cotton that would pass out with the debris. It will be understood that such cotton being in more or less frictional contact with the cotton attached to the reclaiming cylinder, has some tendency to follow the direction of rotation of the reclaiming cylinder. It is caught by the projecting forward end of the deflector grid with whatever debris may be in adherence to it, whisked into the passage 45 between the deflector grid and reclaiming clyinder, and carried around toward the saw clyinder. Since the passage 45 is rather restricted, most of the cotton becomes firmly attached to the teeth of the reclaiming cylinder. That which does not, reaches the saw cylinder and becomes attached to it. Much of the debris accompanying the loose cotton that enters the passage 45 is beaten off by the bars 37 as the cotton passes over them, and falls through the meshes 39. The length of said meshes permits stems and other long debris to pass through, dropping into the debris passage.

The guide pin 44 which passes through the slot in the end wall 3 of the casing 1 is pivotally connected to a link 46, which in turn is pivotally connected to one arm of a bell crank 47 fulcrumed at 48 to said end wall. The other arm of said bell crank is pivotally connected to a pull rod 49, having a handle 50 at its free end, and tooth and rack means 51 for holding it in an adjusted position. The flat extension 42 of the end members 31 and 32 of the grid, close the slot to prevent lint and dust getting out of the casing into the atmosphere of the gin room.

The cotton attached to the saw clinder after having passed the striker roll 21 is removed by a doffing cylinder 52.

The group of cylinders 19, 20, 21 and 52, together with the chamber 22, baffle 17, tiltable brush 23 and adjustable deflector grid 29 may be considered a cotton cleaning unit. Since the cotton removed by the doffing cylinder 52 is only partially cleaned, a series of said cleaning units is provided within the casing 1 and the cotton is subjected successively to the cleaning action of each. In Figure 2, the cotton is cleaned in three successive stages, so three cleaning units have been provided, the first of which has been described. For purpose of identification, the counterpart elements of the several units bear the same reference numerals, those of the second and third units of the series being associated with the letters a and b, a indicating members of the second unit, and b members of the third. The doffing cylinder 52 delivers cotton to the chamber 22a of the second unit and the doffing cylinder 52a, to the chamber 22b of the third unit. The doffing cylinder 52b delivers the cleaned cotton to the chute 10, from which it goes into the gin. The guide pins 44 through which adjustment of the deflector grids is effected are all connected to the pull rod 49 by similar link and bell crank connections, so that the same adjustment is made simultaneously to all of said grids.

While I have in the above description disclosed what I believe to be a preferred and practical embodiment of the invention, it will be understood by those skilled in the art that the specific details of construction and arrangement of parts, as shown and described, are by way of example and not to be construed as necessarily limiting the scope of the invention.

What I claim is:

1. Precleaner for cotton comprising a casing having an inlet opening at the top and having an inclined lower wall, that part of the chamber of said casing which lies adjacent said lower wall constituting a debris passage, driven speed regulatable feeding means at said opening controlling the rate of feed of cotton therethrough, a cotton directing drum below said feeding means, a screen casing the drum on one side and beneath, a baffle casing the drum on the other side terminating short of said screen defining therebetween a lateral opening, means defining with said baffle and the plane of said opening between the adjacent ends of said baffle and screen, a chamber, said chamber defining means comprising a series of cylinders in serial substantial tangency, said cylinders including a saw cylinder intermediate in said series laterally confronting said lateral opening, a striker roll above said saw cylinder laterally confronting said baffle, and a reclaiming cylinder below said lateral opening spaced from the lower end of said screen, and a brush normally occluding said space, said reclaiming cylinder being peripherally contacted by the bristles of said brush, said reclaiming cylinder and brush constituting the bottom of said chamber, said directing drum being driven in a direction to throw cotton through said lateral opening transversely of said chamber above the bottom thereof against said saw cylinder, the latter being driven to move upwardly on the chamber side to said striker roll, the latter being driven in a direction to remove debris from said saw cylinder and dash it against said baffle, the latter functioning to check the velocity of said debris causing it to drop toward said reclaiming cylinder, the latter being driven toward said brush on the chamber side to engage cotton falling to the bottom of said chamber and carry it through the bristles of said brush to said saw cylinder, the bristles of said brush yielding to the pressure of debris riding on the cotton carried by said reclaiming cylinder, to permit the escape of said debris into said debris passage, and a doffer in operative proximity to said saw cylinder at a point in the upper arc of rotation thereof.

2. Precleaner for cotton as claimed in claim 1, said brush being tiltably mounted in said casing, a spring connected to said brush for holding it in normal position with its bristles substantially contacting the periphery of said reclaiming cylinder, said brush being swingable against the bias of said spring responsive to the pressure against it of debris of such nature that prevents it passing said brush by deflecting the bristles, to provide an opening between said bristles and reclaiming cylinder for the discharge of said debris.

3. Precleaner for cotton as claimed in claim 1, including a deflector grid underlying the reclaiming cylinder and overlying the debris passage of said casing, said grid being of circular curvature coaxial with said reclaiming cylinder, spaced therefrom to form a duct leading to a point adjacent the saw cylinder, the forward edge of said grid being positioned to intercept unattached cotton with associated debris that would ordinarily escape past said brush, the latter being tiltable to provide a debris discharge opening, which intercepted cotton is entrained into said duct by the rotation of said reclaiming cylinder, said grid having spaced bars engaged by said cotton for knocking off debris, which drops through said bars into said discharge passage.

4. Precleaner for cotton comprising a casing having an inclined lower wall, that part of the chamber of said casing adjacent the lower wall being a debris passage extending to the lower part of said casing, said casing enclosing the following instrumentalities, a saw cylinder, a reclaiming cylinder clothed with saw teeth, of smaller diameter than said saw cylinder with its axis below that of the saw cylinder, and offset laterally so as to extend beyond a vertical plane tangent to said saw cylinder, said cylinders being substantially tangent with their teeth moving in the same direction in the region of tangency and the saw cylinder being driven at a higher peripheral speed than the reclaiming cylinder whereby cotton is transferred from the reclaiming cylinder to the saw cylinder, partition means between said cylinders and said debris passage including a deflector plate underlying said reclaiming cylinder, spaced therefrom, and a swinging brush having a back journaled in said casing and a row of flexible bristles mounted in said back having their free ends normally contacting said reclaiming cylinder, a spring holding said brush in normal position, means for throwing cotton directly against the side of said saw cylinder in a region above said reclaiming cylinder, whereby some of which cotton becomes attached to said saw cylinder, and some of which falls to said reclaiming cylinder becoming attached thereto, a striker roll tangent to said saw cylinder above the region of cotton delivery thereto, for striking debris from the cotton on said saw cylinder which falls upon said reclaiming cylinder, riding upon the cotton attached to said reclaiming cylinder toward said brush under pressure due to rotation of said reclaiming cylinder, the cotton attached to said reclaiming cylinder being carried thereby between the bristles of said brush, the smaller debris escaping through said brush by deflecting the bristles which it contacts under its incident pressure, said brush being tiltable against its spring bias under pressure of debris too large to pass said bristles, creating an escape opening for passage of said large debris between said brush and reclaiming cylinder.

5. Precleaner for cotton comprising a casing having an inclined lower wall, that part of the chamber of said casing adjacent said lower wall being a debris passage extending to the lower part of said casing, said casing enclosing the following instrumentalities, a saw cylinder, a reclaiming cylinder clothed with saw teeth, of smaller diameter than said saw cylinder with its axis below that of the saw cylinder, and offset laterally so as to extend beyond a vertical plane tangent to said saw cylinder, said cylinders being substantially tangent with their teeth moving in the same direction in the region of tangency and the saw cylinder being driven at a higher peripheral speed than said reclaiming cylinder whereby cotton is transferred from the reclaiming cylinder to the saw cylinder, partition means between said cylinders and said debris passage including a deflector grid underlying said reclaiming cylinder, spaced therefrom to form a duct leading to a point adjacent said saw cylinder, and a swinging brush having a back journaled in said casing and a row of flexible bristles mounted in said back having their free ends normally contacting said reclaiming cylinder, a spring holding said brush in normal position, means for throwing cotton directly against the side of said saw cylinder in a region above said reclaiming cylinder, whereby some of which cotton becomes attached to said saw cylinder, and some of which falls to said reclaiming cylinder becoming attached thereto, a striker roll tangent to said saw cylinder above the region of cotton delivery thereto for striking debris from the cotton on said saw cylinder which falls on said reclaiming cylinder riding upon the cotton attached to said reclaiming cylinder toward said brush under pressure derived from rotation of said reclaiming cylinder, the cotton attached to said reclaiming cylinder passing between the bristles of said brush, the smaller debris escaping through said brush by deflecting the bristles which it contacts under its incident pressure, said brush being tiltable against its spring bias under pressure of debris too large to pass said bristles, creating an escape opening for passage of said large debris between said brush and the forward end of said deflector grid, an arcuate seat in said casing supporting said deflector grid at the rear, means for supporting the front of said grid, said means including a pin extending through a slot in a wall of said casing, said grid being adjustably movable circumferentially to bring its forward edge into optimum position to intercept cotton that would otherwise escape through the opening created by the tilting of the brush, said intercepted cotton being entrained into said duct by rotation of said saw cylinder, said deflector grid having a system of longitudinally arranged spaced bars for knocking off debris from the passing cotton, which drops through the spaces between said bars, and means outside said casing connected to said pin for effecting the circumferential adjustment of said grid.

6. In a precleaner for seed cotton, a saw cylinder, a striker roll above said saw cylinder in operative proximity to the lint fringe outstanding from said saw cylinder, an upright baffle laterally spaced from said striker roll and saw cylinder, intersecting the line of tangency between said roll and cylinder and terminating at its lower end above the bottom of said saw cylinder, to be contacted by motes struck out of said lint fringe by said striker roll, for substantially nullifying the velocity of said motes, a reclaiming cylinder beneath the space between said baffle and saw cylinder cooperating with the latter and being in the path of motes descending gravitationally from said baffle, a directing drum on the side of said baffle opposite said saw cylinder and extending below said baffle, for projecting seed cotton beneath said baffle toward said saw cylinder whereby lighter cotton directly impinges said saw cylinder while heavier cotton falls onto said reclaiming cylinder, the lint fringe on said reclaiming cylinder and the adjacent part of said saw cylinder being subject to surface deposit thereupon of gravitationally descending motes from said baffle, and a grid below said reclaiming cylinder having bars in operative nearness to the lint fringe of said reclaiming cylinder for beating the motes from said lint fringe.

References Cited in the file of this patent
UNITED STATES PATENTS

| | | |
|---|---|---|
| 1,880,934 | Elliott | Oct. 4, 1932 |
| 2,001,223 | Streun | May 14, 1935 |
| 2,001,974 | Mitchell | May 21, 1935 |
| 2,005,265 | Mitchell | June 18, 1935 |
| 2,081,412 | Streun | May 25, 1937 |
| 2,087,390 | Streun | July 20, 1937 |
| 2,100,198 | Mitchell | Nov. 23, 1937 |
| 2,100,301 | Mitchell | Nov. 23, 1937 |
| 2,114,552 | Woodford | Apr. 19, 1938 |